April 1, 1930.  C. T. MYERS  1,752,960
MAGAZINE LUBRICATING MEANS FOR VEHICLE PARTS
Filed May 9, 1924  2 Sheets-Sheet 1
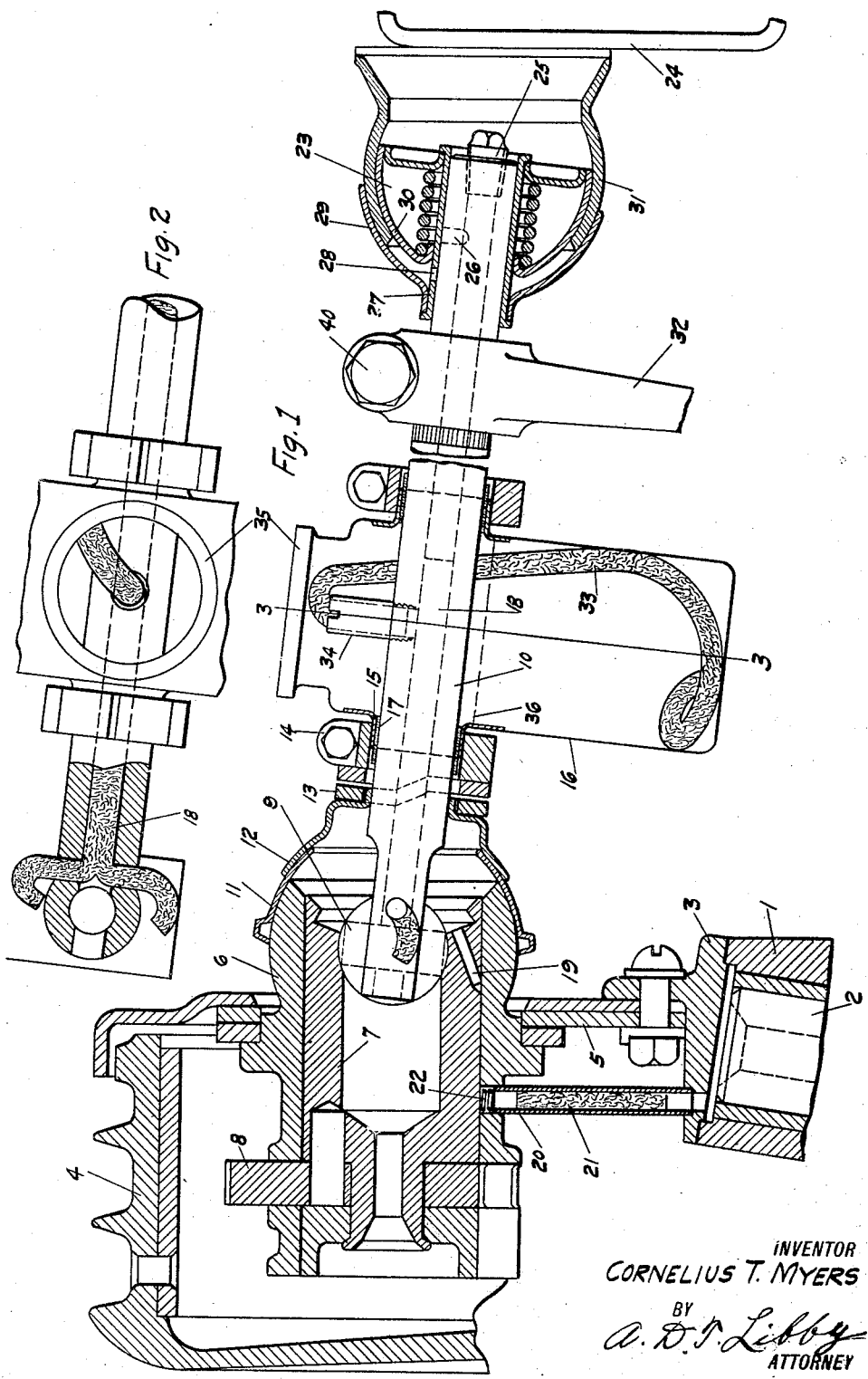
INVENTOR
CORNELIUS T. MYERS
BY
A. D. J. Libby
ATTORNEY

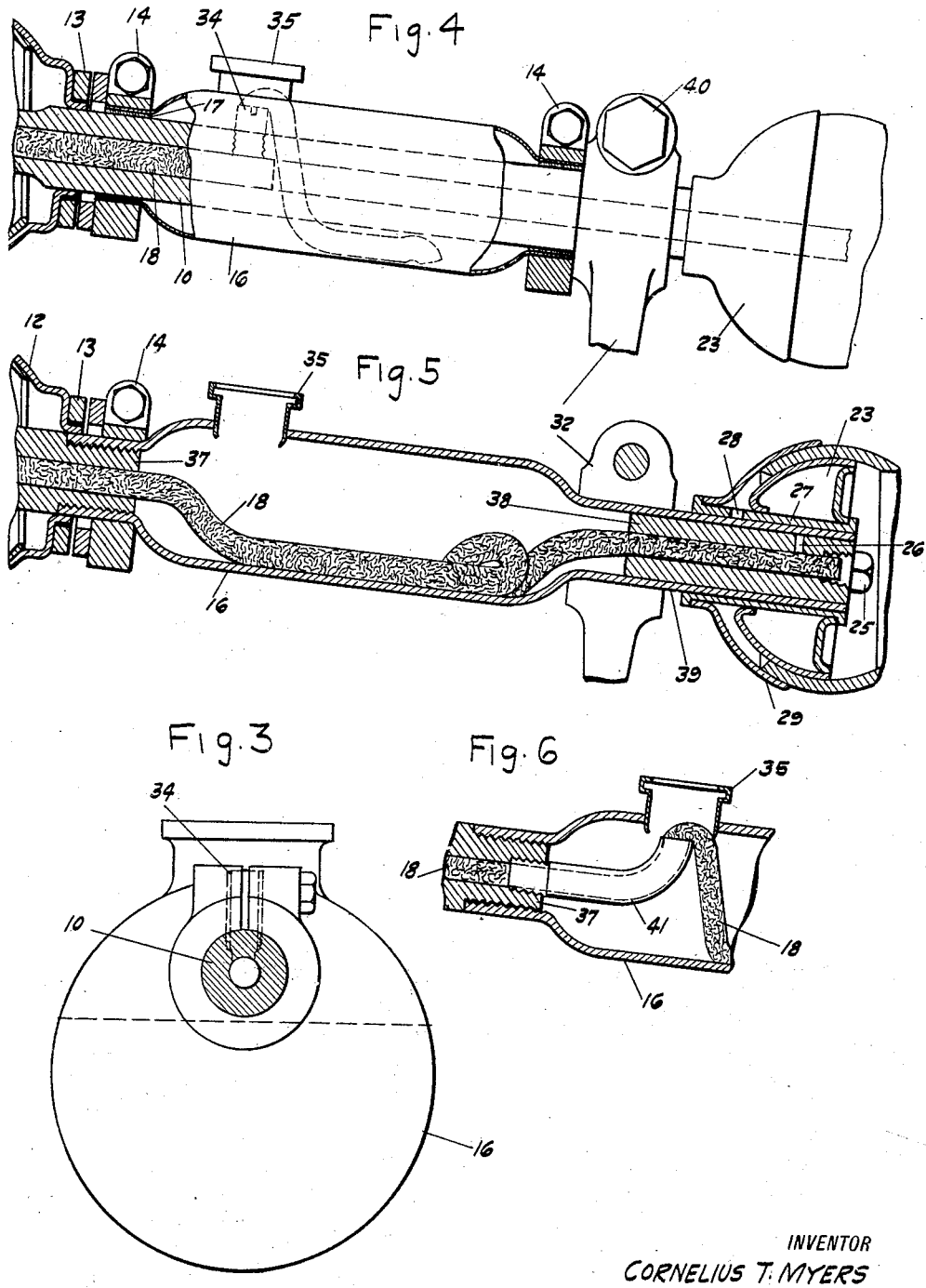

Patented Apr. 1, 1930

1,752,960

UNITED STATES PATENT OFFICE

CORNELIUS T. MYERS, OF AVENEL, NEW JERSEY

MAGAZINE LUBRICATING MEANS FOR VEHICLE PARTS

Application filed May 9, 1924. Serial No. 711,962.

This invention relates to means for lubricating or oiling certain parts or mechanisms used particularly in connection with the braking apparatus of the front wheels of a vehicle, such as an automobile. On front wheels of such vehicles, great care must be taken to enclose the parts to protect them from dust, dirt, water, etc., and where the parts are so enclosed the problem of lubrication becomes a rather difficult one.

Heretofore, so far as I am aware, grease cups have been used for lubricating these devices and it is, therefore, the object of my invention to do away with all grease cups and to provide a single source of oil, which may be fed to not only all the mechanism used in connection with the actuation of the brakes, but also for the pivot bearings of the steering wheels. By providing a suitable reservoir which will contain a considerable quantity of oil, not so much attention is required and the parts will receive a more uniform and better lubrication, as will be readily appreciated when it is remembered that oil is a far better lubricant than grease, since grease is merely a compound in which only a certain amount of oil is carried by an agent which serves for convenience in the application of oil to grease cups. After the oil in the carrying agent passes out, the "grease" hardens and the passages become closed and lubrication ceases.

My present invention will be best understood by reference to the annexed drawing, in which:

Figure 1 is a sectional view through a portion of a front wheel, showing a certain form of brake control mechanism with one form of my invention applied thereto.

Figure 2 is a plan view of the central portion of Fig. 1.

Figure 3 is a section on the line 3/3 of Fig. 1, but with the oil wick not shown.

Figure 4 is a view similar to Fig. 1, but with a modified form of oil reservoir.

Figure 5 is a view similar to Fig. 1, but in which the oil reservoir acts as the control shaft for actuating the brakes.

Figure 6 is a modified form of detail which may be used in connection with Fig. 5.

Since my invention does not relate to the details of the brake control mechanism, per se, these parts will not be described in detail, but I have shown the application of my invention to a well-known form of front wheel brake control in which 1 is a part of the wheel spindle and 2 is the pivot pin, 3 being a cap closing the opening over the pivot pin 2. 4 is a brake drum attached to the wheel in the usual manner. A carrier plate 5 supports a bracket 6 having a cam-shaft 7 and cam 8 carried thereby. The cam shaft 7 is connected through a universal joint 9 to a control shaft 10. The universal joint 9 is enclosed within the dust caps 11 and 12 which are held in place by the resilient member 13 and a clamp 14, which also serves to engage the collar 15, preferably formed integral with the reservoir 16. A gasket 17 serves to make an oil tight joint between the collar 15 and the shaft 10. A corresponding clamp, collar and gasket are used on the opposite side of the reservoir 16.

The shaft 10 is hollow and has positioned therein a square wick 18 which leads in one direction to the universal joint 9, where it splits into two branches as indicated in Fig. 2. The oil is thus fed to the parts of the universal joint and by means of the passage 19, the oil lubricates the bearing for the camshaft 7 in the carrier bracket 6. Some of the oil finds its way through the tube 20 and wick 21 to a point adjacent the pivot pin 2 of the steering wheel. A spring 22 is used to hold the tube 20 in position in the cap 3. The wick 18 may also extend toward the chassis end of the control shaft 10, which is supported in a ball and socket joint, generally referred to as 23; this joint being fastened to one side of the chassis 24 in any suitable manner. The end of the shaft 18 is plugged with a pipe cap 25 so that the oil will pass through the hole 26 to lubricate the operation of the control shaft 10 back and forth within the sleeve 27 of the joint 28. A hole 28 allows some of the oil to lubricate the dust cap 29 and the cup 30, both of which function in slidable contact with the member 31. An actuating shaft 32 is attached to the control shaft 10 in the usual manner. The oil reservoir 16 is provided with a feed wick 33 which extends upward into a tube 34, which is fastened to a transverse hole in the shaft 10, thereby completing communication between the wick 33 and the wick 18 within the control shaft. A suitable cap 35 is provided for the reservoir 16 for the purpose of closing the opening in the reservoir. The dotted line 36 indicates about the position of the oil when the reservoir is properly charged. The fit of the wick 33 in the tube 34 as well as of the wick 18 in the shaft 10 is such that the flow of lubricant is controlled to give the proper lubrication to the previously mentioned described parts. I may also use a further control in connection with the flow of oil, such as described in my Patent 1,620,277 issued March 8, 1927.

In Fig. 4, the reservoir 16 is made more cylindrical in shape, thereby giving a neater appearance to the installation than that in the form of reservoir shown in Fig. 1.

In Fig. 5, the reservoir 16 is so constructed as to constitute the control shaft itself, one end being formed down and preferably threaded to engage a stub shaft 37, the other end of which terminates in a universal joint 9, the same as in Fig. 1; the same clamp 14 and resilient member 13 being used, the same as heretofore described in connection with Fig. 1. The opposite end of the reservoir is formed to fit the sleeve 27 of the ball joint 23. A plug member 38 is preferably used to fill this extended end 39. The member 38 may be extended as indicated to a point beneath the actuating lever 32, so that when this is clamped together as by means of the bolt 40, the tubular end 39 will not be crushed. Instead of the wick 18 going directly into the stub shaft 37, a nipple 41 may be used for controlling the flow of lubricant to the universal joint parts and the wheel pivot.

While I have described the application of my invention particularly with respect to the control shaft on front wheel brake mechanisms, it will be apparent that the invention is applicable to any semi-rotating shaft, such for example as the brake rocker shafts fastened to the chassis frame or those fastened to the rear axle, or other similar rocking shafts for the control of other mechanisms, wherein the bearings or parts located on these shafts are to be lubricated.

From what has been said it will be apparent that the details of my invention may be modified considerably without departing from the spirit of the same and the scope of the appended claims.

Having thus described my invention, what I claim is:

1. In vehicle front wheel brake operating mechanisms including a universal joint at the wheel and a joint at the chassis; means for lubricating said mechanisms comprising, a hollow control shaft extending between the said two joints, a chamber constituting an oil reservoir surrounding and fastened to said shaft, a nipple positioned in the wall of the shaft, a wick in the reservoir and extending into said nipple, a wick in the hollow part of said shaft leading toward at least one of said joints, and means for charging said chamber with oil.

2. In a vehicle having a chassis, a wheel pivot pin, a bracket associated with said pin and brake cam operating means supported by said bracket and including a universal joint, the combination with said chassis and said operating means of a tube leading from a point near said pin to the interior of said bracket, a joint on said chassis, a hollow control rod connected to said joints, a reservoir associated with said rod, a wick in said reservoir positioned to convey lubricant therefrom to said rod, and means for conveying lubricant from said rod through said joints and to said tube.

3. In vehicle front wheel brake operating mechanisms including a universal joint at the wheel and a joint at the chassis; a control shaft between said joints with oil passages leading from both ends thereof to the joints, means for passing lubricant from the universal joint to the wheel pivot bearing, an oil reservoir associated with said control shaft and a wick in the reservoir leading to said shaft oil passages for controlling the feed of oil thereto as and for the purpose described.

4. Means for lubricating on a vehicle, the steering wheel pivots and brake actuating mechanism for said steering wheels, including for each wheel, a hollow brake control shaft, a lubricant reservoir movable with said shaft, means within the reservoir for feeding llubricant from at least one end of said shaft to its associated brake mechanism and means for conveying a part of the lubricant from said brake actuating mechanism to said wheel pivot.

5. In a vehicle having brake mechanisms including a hollow shaft; means for lubricating all of said mechanisms, comprising, an oil reservoir movable with said shaft and means within the reservoir for feeding under control, lubricant therein to and from at least one end of said hollow shaft.

6. In a structure of the class described, including a wheel brake and a chassis; the combination with said wheel and said chassis of a hollow control shaft and means at each end of the shaft connecting the same with said wheel and chassis, including each a joint, a single oil reservoir carried by and around said shaft and means for feeding under control oil from said reservoir through said shaft to each of said joints.

7. In a vehicle having a brake mechanism for at least part of its wheels, including an operating shaft having a passageway at least at one end, means for lubricating at least the brake actuating mechanism at a wheel, comprising; an oil reservoir movable with said shaft and means within the reservoir for feeding under control lubricant therein to and from said passageway in the shaft.

8. In a vehicle having a chassis, a wheel pivot pin for association with a wheel spindle, a brake operating means including a universal joint and a support therefor, the combination with said chassis and said operating means of a member having a passage leading from a point near said pin to said support, a joint on said chassis, a channeled control rod connected to said joints, a fluid lubricant reservoir, a wick in said reservoir positioned to convey lubricant from the reservoir by way of the channeled portion of the rod to at least one of said joints and to said member having said passage.

9. In a vehicle, a wheel pivot pin, a brake operating means and at least one support therefor adjacent said pin, the combination with said brake operating means, of a member having a passage leading from a point near said pin to the interior of said one support, a hollow control rod for said brake operating means, a reservoir carried by said rod, a wick in said reservoir positioned to convey lubricant therefrom through the hollow portion of said rod, and means for insuring that the lubricant is conveyed to the brake operating means and to the passageway of said member leading to the point adjacent said pin.

In testimony whereof, I affix my signature.

CORNELIUS T. MYERS.